United States Patent
Lowell et al.

(10) Patent No.: US 10,688,461 B2
(45) Date of Patent: Jun. 23, 2020

(54) SYSTEMS AND METHODS FOR DETECTING AND CONTROLLING BED HEIGHT IN FLUIDIZED BED REACTORS

(71) Applicant: Chevron Phillips Chemical Company LP, The Woodlands, TX (US)

(72) Inventors: Jeffrey S. Lowell, Huffman, TX (US); Eric A. Ross, Orange, TX (US); Kyle H. Leger, Iowa, LA (US); Tess E. Stecklein, Beaumont, TX (US); Purnik Amin, Richmond, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 97 days.

(21) Appl. No.: 15/843,450

(22) Filed: Dec. 15, 2017

(65) Prior Publication Data
US 2019/0184361 A1   Jun. 20, 2019

(51) Int. Cl.
| | | |
|---|---|---|
| *B01J 8/18* | (2006.01) | |
| *B01J 8/42* | (2006.01) | |
| *C08F 10/02* | (2006.01) | |
| *C08F 110/02* | (2006.01) | |

(52) U.S. Cl.
CPC .............. *B01J 8/1809* (2013.01); *B01J 8/42* (2013.01); *C08F 10/02* (2013.01); *C08F 110/02* (2013.01); *B01J 2208/0061* (2013.01); *C08F 2400/02* (2013.01)

(58) Field of Classification Search
CPC ............... C08F 10/02; B01J 8/18; B01J 8/42
See application file for complete search history.

(56) References Cited

U.S. PATENT DOCUMENTS

| | | |
|---|---|---|
| 4,580,052 A | 4/1986 | Hoffman et al. |
| 4,993,264 A | 2/1991 | Cody et al. |
| 6,460,412 B1 | 10/2002 | Cai et al. |
| 6,879,425 B2 | 4/2005 | Damm et al. |
| 9,587,096 B2 | 3/2017 | Hedesiu et al. |
| 2014/0264040 A1 | 9/2014 | Cahill et al. |
| 2015/0217252 A1 | 8/2015 | Bucci et al. |
| 2018/0105613 A1 | 4/2018 | Lowell et al. |

FOREIGN PATENT DOCUMENTS

CA    2178238 A1    12/1997

OTHER PUBLICATIONS

Endress+Hauser, "Radiometric measurement technology" Competence Brochure. (Year: 2013).*
Escudero, "Bed Height and Material Density Effects on Fluidized Bed Hydrodynamics" (2010). Graduate Theses and Dissertations.
Operating Principle of Nuclear Level Sensors, Learning Instrumentation and Control Engineering. http://www.instrumentationtoolbox.com/2014/08/operating-principle-of-nuclear-level.html [accessed Jun. 15, 2017].
Radiation-Based Level Gages, Transactions, vol. 4, pp. 1-14. https://www.omega.com/literature/transactions/volume4/T9904-14-RAD.html [accessed Jun. 15, 2017].

* cited by examiner

*Primary Examiner* — Catherine S Branch
(74) *Attorney, Agent, or Firm* — Eversheds Sutherland (US) LP

(57) ABSTRACT

Systems and methods for detecting and controlling bed height in fluidized bed reactors are disclosed. The systems and methods employ a plurality of radiation sources and a detector array located along the outer surface of a fluidized bed reactor.

19 Claims, 4 Drawing Sheets

SYSTEMS AND METHODS FOR DETECTING AND CONTROLLING BED HEIGHT IN FLUIDIZED BED REACTORS

TECHNICAL FIELD OF THE INVENTION

This application relates to systems and methods for controlling bed height in fluidized bed reactors.

BACKGROUND

Fluidized bed reactors are widely used in the chemical industry for manufacturing various materials and can be particularly useful in the manufacture of polyethylene. To ensure efficient operation of a fluidized bed reactor, it is desirable to control operations to keep the level of the fluidized bed as high as possible, while allowing as few solids as possible to escape the fluidized bed reactor. However, controlling the level of the fluidized bed is often difficult because the top of the bed is often not well-defined, which can lead to inaccurate measurements of bed height and result in inefficient operations.

Numerous methods of controlling the level of the fluidized bed have been described over the years, including, for example, using a series of pressure differential taps along the height of the fluidized bed reactor to calculate the fluidized bulk density and estimate the height of the fluidized bed. However, the impulse legs of the pressure taps are often prone to plugging with solids and/or condensable liquids, resulting in inaccurate pressure measurements. Regular purging of the fluidized bed reactor can help prevent or reduce plugging of these pressure taps. However, the purging of the pressure taps results in a temporary loss of bed level indication, which can lead to bed level upsets and increased fines carry-over out of the reactor. These impact reactor production rates, product quality, and in some cases result in reactor downtime, resulting in substantial inefficiencies and higher costs. Further, because the propensity of these pressure taps to plug with solids and/or condensable liquids is known, the level of the fluidized bed in the fluidized bed reactor is often kept at levels significantly lower than the maximum fluidized bed height, in an effort to minimize fines carry over even with inaccurate pressure measurements and bed height calculations.

Accordingly, there is a need for improved methods of measuring and controlling the bed height in fluidized bed reactors.

SUMMARY OF THE INVENTION

This summary is provided to introduce various concepts in a simplified form that are further described below in the detailed description. This summary is not intended to identify required or essential features of the claimed subject matter nor is the summary intended to limit the scope of the claimed subject matter.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

In one aspect, a system for detecting and/or controlling the level of solids in a fluidized bed reactor is provided, the system including: a fluidized bed reactor having a top end, a spaced-apart bottom end, a height, a circumference at each vertical distance from the bottom end, an outer surface, an inner surface, and an interior space; a plurality of nuclear radiation sources disposed along the outer surface of the fluidized bed reactor between the top end and the bottom end, each at a different vertical distances from the bottom end; and a detector array comprising a plurality of radiation detectors disposed along the outer surface of the fluidized bed reactor between the top end and the bottom end, each at a different vertical distance from the bottom end, wherein a line between each radiation detector and each nuclear radiation source passes through the interior space of the fluidized bed reactor. In some embodiments, the fluidized bed reactor includes a reaction zone comprising a cylindrical portion extending from the bottom end toward the top end and having a reaction zone circumference; and an expansion zone above the reaction zone and having an expansion zone circumference at each vertical distance along the expansion zone that is greater than the reaction zone circumference. In some embodiments, the fluidized bed reactor includes a distribution grid at the spaced-apart bottom end. In another aspect, a method for detecting, controlling, and/or optimizing the level of solids in a fluidized bed reactor is provided, the method including: providing a fluidized bed reactor having a top end, a spaced-apart bottom end, a height, a circumference at each vertical distance from the bottom end, an outer surface, an inner surface, and an interior space; irradiating the interior space of the fluidized bed reactor using a plurality of nuclear radiation sources disposed along the outer surface of the fluidized bed reactor between the top end and the bottom end, each at a different vertical distances from the bottom end; and measuring the intensity of the nuclear radiation from the plurality of nuclear radiation sources using a detector array comprising a plurality of radiation detectors disposed along the outer surface of the fluidized bed reactor between the top end and the bottom end, each at a different vertical distance from the bottom end, wherein a line between each radiation detector and each nuclear radiation source passes through the interior space of the fluidized bed reactor; and calculating the level of solids in the fluidized bed reactor based on comparing the intensities of the nuclear radiation measured at the plurality of radiation detectors. In some embodiments, the fluidized bed reactor includes a reaction zone comprising a cylindrical portion extending from the bottom end toward the top end and having a reaction zone circumference; and an expansion zone above the reaction zone and having an expansion zone circumference at each vertical distance along the expansion zone that is greater than the reaction zone circumference. In some embodiments, the fluidized bed reactor includes a distribution grid at the spaced-apart bottom end. In some embodiments, the method includes calculating the level of fines carry-over out of the fluidized bed reactor by comparing the intensity of nuclear radiation measured at a nuclear radiation detector located above the widest part of the expansion zone to experimental data. These and other aspects and embodiments according to this disclosure are provided in the drawings, detailed description and claims.

BRIEF DESCRIPTION OF THE DRAWINGS

The following figures form part of the present specification and are included to further demonstrate certain aspects of the present disclosure. The invention may be better understood by reference to one or more of these figures in combination with the detailed description of specific aspects presented herein.

DEFINITIONS

Figure 1:
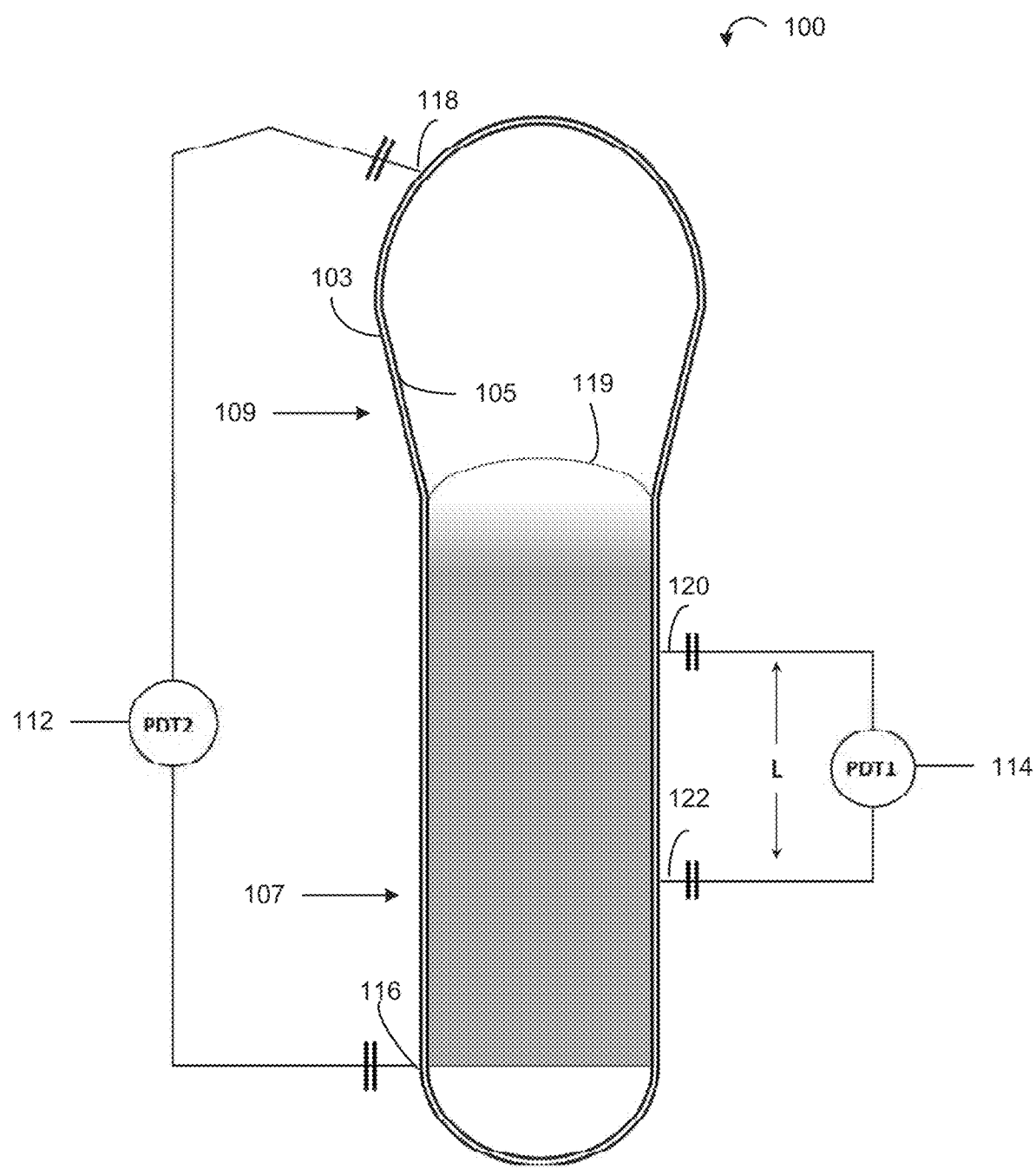
FIG. 1 is a schematic illustration of a system for estimating the level of a fluidized bed using pressure differential transmitters.

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs, and unless otherwise indicated or the context requires otherwise, these definitions are applicable throughout this disclosure. Further, unless otherwise required by context, singular terms shall include pluralities and plural terms shall include the singular. For example, if a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Unless explicitly stated otherwise in defined circumstances, all percentages, parts, ratios, and like amounts used herein are defined by weight.

Further, in this connection, certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination.

Regarding claim transitional terms or phrases, the transitional term "comprising", which is synonymous with "including", "containing", or "characterized by" is inclusive or open-ended and does not exclude additional, un-recited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/ or feature classes (for example, a method step, feedstock features, and/or product features, among other possibilities), the transitional terms comprising, consisting essentially of, and consisting of, apply only to the feature class to which is utilized and it is possible to have different transitional terms or phrases utilized with different features within a claim. For example, a method can comprise several recited steps (and other non-recited steps) but utilize a catalyst system preparation consisting of specific steps and utilize a catalyst system comprising recited components and other non-recited components. While compositions and methods are described in terms of "comprising" various components or steps, the compositions and methods can also "consist essentially of" or "consist of" the various components or steps.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

"Optional" or "optionally" means that the subsequently described event or circumstance can or cannot occur, and that the description includes instances where the event or circumstance occurs and instances where it does not.

The terms "configured for use" or "adapted for use" and similar language is used herein to reflect that the particular recited structure or procedure is used in a system or process as disclosed herein. For example, unless otherwise specified, a particular structure "configured for use" means it is "configured for use in a fluidized bed reactor system", including for example, "configured for use in an olefin polymerization reactor system" and therefore is designed, shaped, arranged, constructed, and/or tailored to effect a gas phase olefin polymerization, as would have been understood by the skilled person.

The term "fluidized bed" is used broadly to refer to a mixture of one or more solid particulate materials and one or more fluid materials which are placed under conditions appropriate to cause the mixture of solid particulate materials and fluid materials to exhibit fluid-like properties. For example, in some embodiments, the upper surface of the fluidized bed may be relatively horizontal, analogous to hydrostatic behavior, and the fluidized bed may be a heterogeneous mixture of the one or more solid particulate materials and the one or more fluid materials, such that the fluidized bed can be represented by a single bulk density.

The term "fluidized bed reactor" is used broadly to refer to a reactor configured to react components in a fluidized bed. For example, a fluidized bed reactor may include a polyolefin reactor configured to fluidize one or more solid catalyst particles with a gas comprising, for example, ethylene at conditions sufficient to produce polyethylene in the fluidized bed.

The term "bed level" is used broadly to refer to the level of the upper surface of the fluidized bed in the fluidized bed reactor.

The term "transport disengaging height" or TDH is used broadly to refer to the distance in height within the reactor to transition from the "dense phase" of the fluidized bed to a "constant" entrainment rate above the fluidized bed.

The term "freeboard height" is used broadly to refer to the distance between the "dense phase" of the fluidized bed and the reactor outlet. More specifically, the freeboard height may be defined as the distance between the "dense phase" of the fluidized bed and the widest part of the expansion zone of the reactor.

The terms "distributor," "fluidization grid," "distribution grid," "grid plate," and "grid" are used broadly to refer to a grid plate which may be located at the bottom of a fluidized bed reactor, which may be used to provide sufficient gas distribution of the fluidizing gas into the fluidized bed reactor. For example, grid plates may be perforated plates, or may include bubble-caps and/or shrouds to minimize particles falling through the plate.

The term "nuclear radiation source" is used broadly to refer to any suitable generator of nuclear radiation. For example, "nuclear radiation source" can refer to radioisotopes that are sources of gamma-radiation, although the nuclear radiation source can also be the source of other types of radiation. In some embodiments, the nuclear radiation source may include caesium-137 (also written cesium-137) ($^{137}$Cs), cobalt-60 ($^{60}$Co), or combinations thereof. Some of the radioisotopes that are nuclear radiation sources are sources of gamma-radiation and other radiation, such as beta-radiation.

The term "nuclear radiation detector" is used broadly to refer to any device capable of detecting nuclear radiation from one or more nuclear radiation sources. Nuclear radiation detectors may include, for example, devices capable of detecting alpha particles, beta particles, gamma rays, or any combinations thereof. The nuclear radiation detectors used in this disclosure are selected based on their suitability for detecting the radiation emitted from the nuclear radiation source.

The term "fines", "solid fines", "polymer fines", "solid polymer fines" and the like are used interchangeably herein to refer to solid particles which have an average particle size of less than the median particle size of the solid particles in the relevant gaseous stream comprising such particles. In one aspect, solid fines can have an aerodynamic diameter of about or less than 2.5 μm (microns) (also referred to as PM2.5), 5 microns, 10 microns, 20 microns, 50 microns, 75 microns, 200 mesh, 125 microns, or 120 mesh. Even though the term "polymer" may be associated with the term "fines", this term is intended to encompass any solid particle in the subject gaseous stream, including catalyst or pre-polymer particles that may be charged to the reactor, growing polymer particles, agglomerated polymer particles, and the flakes or spalling of polymer particles. In some embodiments, the polymer particle size in the process can include but is not limited to the following sizes; Group A, 30 to 100 microns; Group B, 100 to 1,000 microns; Group C, 0 to 30 microns. The polymer should not be construed to be limited to any particular particle size distribution.

As used herein, the term "fines carryover" refers to the fines which are entrained in a fluid and carried through an outlet of the fluidized bed reactor. For example, in one aspect, the term "fines carryover" refers to polyethylene fines entrained in a gas stream which exit a polyethylene fluidized bed reactor.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" (α-olefin) refers to an olefin that has a double bond between the first and second carbon atom of the longest contiguous chain of carbon atoms. The term "alpha olefin" includes linear and branched alpha olefins unless expressly stated otherwise.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, or within 5% of the reported numerical value, or within 2% of the reported numerical value.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

DETAILED DESCRIPTION OF THE INVENTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

This disclosure provides improved systems and methods for detecting, controlling, and optimizing the bed level in fluidized bed reactors. Advantageously, in the systems and methods disclosed herein, the bed level of a fluidized bed may be controlled without the use of pressure taps which are prone to clogging and fouling. Surprisingly, even though the fluidized bed does not contain a well-defined top, and often contains large voids or bubbles within the bed, which have historically rendered detecting and/or controlling the level with radioactive generators and detectors impractical or impossible, the systems and methods described herein can be successfully used to measure, control and adjust the bed levels of fluidized bed reactors.

In some embodiments, the systems and methods for detecting and controlling the bed levels of fluidized bed reactors disclosed herein advantageously enable the bed level of a fluidized bed to be controlled at as high a level as possible while minimizing fines carryover.

According to one aspect, this disclosure provides a system for detecting and/or controlling the level of solids in a fluidized bed reactor, the system comprising a fluidized bed reactor having a top end, a spaced-apart bottom end, a height, a circumference at each vertical distance from the bottom end, an outer surface, an inner surface, and an interior space; a plurality of nuclear radiation sources disposed along the outer surface of the fluidized bed reactor between the top end and the bottom end, each at a different vertical distances from the bottom end; and a detector array comprising a plurality of radiation detectors disposed along the outer surface of the fluidized bed reactor between the top end and the bottom end, each at a different vertical distance from the bottom end, wherein a line between each radiation detector and each nuclear radiation source passes through the interior space of the fluidized bed reactor.

In another aspect, a method of detecting and/or controlling the level of solids in a fluidized bed reactor is provided, the method including providing a fluidized bed reactor having a top end, a spaced-apart bottom end, a height, a circumference at each vertical distance from the bottom end, an outer surface, an inner surface, and an interior space; irradiating the interior space of the fluidized bed reactor using a plurality of nuclear radiation sources disposed along the outer surface of the fluidized bed reactor between the top end and the bottom end, each at a different vertical distances from the bottom end; and measuring the intensity of the nuclear radiation from the plurality of nuclear radiation sources using a detector array comprising a plurality of radiation detectors disposed along the outer surface of the fluidized bed reactor between the top end and the bottom end, each at a different vertical distance from the bottom end, wherein a line between each radiation detector and each nuclear radiation source passes through the interior space of the fluidized bed reactor; and calculating the level of solids in the fluidized bed reactor based on comparing the intensities of the nuclear radiation measured at the plurality of radiation detectors.

In some embodiments, each of the plurality of nuclear radiation sources is located within a first vertical plane that contains the vertical axis of the fluidized bed reactor, and each of the plurality of nuclear radiation detectors is located within a second vertical plane that contains the vertical axis of the fluidized bed reactor. In embodiments, the angle between the first vertical plane and the second vertical plane is about 0°, such that the plurality of nuclear radiation sources and the plurality of radiation detectors are disposed on opposite sides of the fluidized bed reactor. That is, in some embodiments, the intersection of the first vertical plane with the outer surface of the fluidized bed reactor and the intersection of the second vertical plane with the outer surface of the fluidized bed reactor are separated by 180° around the outer circumference of the fluidized bed reactor.

In some embodiments, one or more of the plurality of nuclear radiation sources includes a radioactive source which emits gamma rays. For example, in some embodiments, the plurality of nuclear radiation sources includes nuclear radiation sources which are commercially-available from Vega Americas, Inc. sold under the tradenames VEGASOURCE™ 31 and VEGASOURCE™ 35. In some embodiments, the plurality of radiation detectors may include commercially-available level gauges available from Vega Americas, Inc. sold under the trade names PROTRAC®, FIBERTRAC™ 31, FIBERTRAC™ 32, SOLITRAC™ 31, and Thermo Fisher Scientific under the trade name Texas Nuclear Kay/Ray Sensall.

In some embodiments, the detector array further includes a computer configured to compare the measured intensity of the nuclear radiation at the plurality of radiation detectors, determine the level of solids in the fluidized bed reactor, and adjust the level of solids in the fluidized bed reactor. For example, in some embodiments, the computer may be configured to determine the level of solids in the fluidized bed reactor by using the following equation:

$$\text{Bed height} = \left( C1 + \sum_{i=1}^{n} (\text{Detector Length}_i * \text{Radiation Intensity}_i) \right) * C2$$

Where C1 is the distance from the distribution grid to the bottom end of the lowest radiation detector, C2 is the normalized fluidized bulk density factor, and n is the number of radiation detectors.

In some embodiments, the computer may be configured to adjust the level of solids in the fluidized bed reactor by adjusting one or more process parameters, for example by opening or adjusting one or more valves, compressors, pumps, condensers, boilers, heat exchangers, and the like. In some embodiments, the process parameters adjusted may be those of the fluidized bed reactor. For example, in some embodiments, the computer may be configured to directly or indirectly adjust one or more of a solids removal rate from the fluidized bed reactor, a fluidization velocity within the fluidized bed reactor, a catalyst feed rate to the fluidized bed reactor, a reactor gas density within the fluidized bed reactor, a reactor gas composition, a reactor temperature, and/or a reactor pressure. That is, any one or any combination of these parameters may be adjusted as understood by the skilled person in order to maintain or achieve a selected fluidized bed height. In some embodiments, the process parameters adjusted may be of processes upstream or downstream of the fluidized bed reactor.

In some embodiments, the fluidized bed reactor is a gas phase polyethylene reactor. In these embodiments, the fluidized bed reactor includes at least one ethylene inlet, at least one catalyst inlet, and at least one polyethylene outlet. The gas phase polyethylene may be used with one or more diluent gases to fluidize solid catalyst particles, and the gas phase ethylene will react with the catalyst in the fluidized bed, forming fine polyethylene particles. These polyethylene particles may be removed through one or more polyethylene outlets and fed to downstream processes.

In some embodiments, the fluidized bed reactor is a polymerization reactor containing at least one monomer inlet and at least one polymer outlet. A catalyst (e.g., Ziegler-Natta, metallocene, chromium-based, post-metallocene, nickel, etc.) for facilitating the polymerization of monomers may be added to the reactor. For example, the catalyst may be a particle added via a reactor feed stream and, once added, suspended in the fluid medium within the reactor. Catalysts are generally not consumed in the polymerization reaction in the manner that monomers are consumed. An inert hydrocarbon, such as iso-butane, propane, n-pentane, iso-pentane, neopentane, n-hexane, and/or heptane, and so on, may be added to the reactor and utilized as a diluent to carry the contents of the reactor and/or to provide reactor cooling.

In some embodiments, the fluidized bed reactor includes a reaction zone comprising a cylindrical portion extending from the bottom end toward the top end and having a reaction zone circumference; and an expansion zone above the reaction zone and having an expansion zone circumference at each vertical distance along the expansion zone that is greater than the reaction zone circumference. For example, in a polyethylene gas phase fluidized bed reactor, gas-phase ethylene monomer may be reacted with a fluidized solid catalyst in the reaction zone, and polyethylene fine particles may be gathered from the expansion zone. For example, in some embodiments, polyethylene fines may be entrained in the fluidizing gas stream and transferred from the expansion zone to downstream equipment, such as one or more cyclones to separate the polyethylene fines from a gas stream. The separated polyethylene fines may then be fed to one or more eductors, and convergent-divergent nozzles, as described in U.S. patent application Ser. No. 15/730,314, entitled "Elimination of Polymerization Fouling in Fluidized Bed Gas-Phase Fines Recovery Eductors," the entirety of which is hereby incorporated herein by reference, and recycled to the fluidized bed reactor.

In some embodiments, the expansion zone comprises a conical transition portion between the reaction zone and the top end of the fluidized bed reactor, such that the diameter of the transition zone increases with increasing distance from the reaction zone. In some embodiments, the expansion zone further includes a domed top, such that the diameter of the transition first increases with increasing distance from the reaction zone and then decreases to form a closed domed top.

In some embodiments, the fluidized bed reactor contains one or more inlets and one or more outlets. For example, the fluidized bed reactor may contain one or more solids inlets and one or more fluid inlets. For example, in some embodiments, the reaction zone may contain one or more solid catalyst inlets, one or more fluidizing gas-phase inlets which may be configured to introduce fluidizing gas to the reaction zone through a fluidizing distribution grid, and one or more motive gas inlets. In some embodiments, the fluidized bed reactor may contain one or more solids inlets in the reaction zone configured to receive one or more catalysts; a fluidizing gas inlet in the reaction zone configured to receive a gas-phase monomer, a co-monomer, inert gases, and one or more diluent gases; one or more inert condensable liquid (ICAs) inlets; one solids outlet in the expansion zone configured to remove solid phase polymer particles from the fluidized bed reactor; and one solids inlet in the reaction zone configured to receive an entrained mixture of solid phase polymer particles, gas-phase monomer and one or more diluent gases; and one or more fluidizing gas outlets in the expansion zone. In some embodiments, the one or more fluidizing gas outlets in the expansion zone may be located in the domed top of the expansion zone.

In some embodiments, the plurality of nuclear radiation sources includes at least one radiation source having a radioactivity of 5000 millicurie (mCi) located on the outer surface of the reaction zone, the expansion zone, or both. In some embodiments, the plurality of nuclear radiation sources includes at least 2 radiation sources or at least 3 radiation sources, for example, 2 radiation sources, 3 radiation sources, 4 radiation sources, 5 radiation sources, 6 radiation sources, 7 radiation sources, 8 radiation sources, and so on. In some embodiments, the plurality of radiation detectors includes at least 3 nuclear radiation detectors or at least 4 nuclear radiation detectors, for example 3 radiation detectors, 4 radiation detectors, 5 radiation detectors, 6 radiation detectors, 7 radiation detectors, 8 radiation detectors, 9 radiation detectors, and so on.

In some embodiments, the system includes more radiation detectors than radiation sources. For example, in an embodiment, the system includes 4 nuclear radiation sources and 6 radiation detectors. In other embodiments, the system includes: 2 nuclear radiation sources and 2, 3 or 4 radiation detectors; alternatively, the system includes 3 nuclear radiation sources and 3, 4, 5, or 6 radiation detectors; alternatively, the system includes 4 nuclear radiation sources and 4, 5, 6 or 7 radiation detectors; or alternatively, the system includes 5 nuclear radiation sources and 5, 6, 7, or 8 radiation detectors.

In some embodiments, one or more of the plurality of radiation detectors is an ionization chamber, a proportional counter, a Geiger-Müller tube, a scintillator, or any combinations thereof.

In some embodiments, one or more of the plurality of nuclear radiation sources is a cesium gamma ($\gamma$) radiation source ($^{137}Cs$), a cobalt gamma ($\gamma$) radiation source ($^{60}Co$), or any combination thereof. In some embodiments, the plurality of nuclear radiation sources includes at least one radiation source having a radioactivity of 5000 mCi. In some embodiments, the plurality of nuclear radiation sources includes at least one 5000 mCi radiation source, at least one 2000 mCi radiation source, at least one 1000 mCi radiation source, and/or at least one 500 mCi radiation source. That is, any combination of these sources can be used. In one embodiment, the plurality of nuclear radiation sources includes one 5000 mCi radiation source, one 2000 mCi radiation source, one 1000 mCi radiation source, and one 500 mCi radiation source.

In some embodiments, the fluidized bed reactor is a polyolefin reactor. For example, in some embodiments, the fluidized bed reactor is a polyethylene reactor.

In another aspect, a method of reducing fines carryover from a fluidized bed reactor is provided including adjusting the level of solids in the fluidized bed reactor based on the level of solids in the fluidized bed reactor calculated according to any of the methods described above. For example, in some embodiments, the step of adjusting the level of solids in the fluidized bed reactor may include adjusting one or more of a solids removal rate, a fluidization velocity, a catalyst feed rate, a reactor gas density, a reactor gas composition, a reactor temperature, or a reactor pressure.

Illustrated Embodiments

FIG. 1 illustrates a cross-sectional view of an exemplary fluidized bed reactor 100 and system for detecting the level of a fluidized bed. The fluidized bed reactor 100 has an outer surface 103, an inner surface 105, a reaction zone 107 and an expansion zone 109. The reactor is shown with a fluidized bed 119 of material. The system includes two pressure differential transmitters 112, and 114. The pressure differential transmitter 112 measures the pressure differential between the bottom 116 of the reaction zone 107 and the top 118 of the fluidized bed reactor 100. The pressure differential transmitter 114 measures the pressure differential between an upper location 120 within the reaction zone 107 and a lower location 122 within the reaction zone 107, which are separated by a distance L. The height of the fluidized bed 119 can be estimated using the measurement PDT1, PDT2 of the pressure differential transmitters 112, 114. Specifically, the height of the fluidized bed 119 can be estimated using the following formula:

$$\text{Bed height} = \frac{PDT2}{\left(\frac{PDT1}{L}\right)}$$

Figure 2:
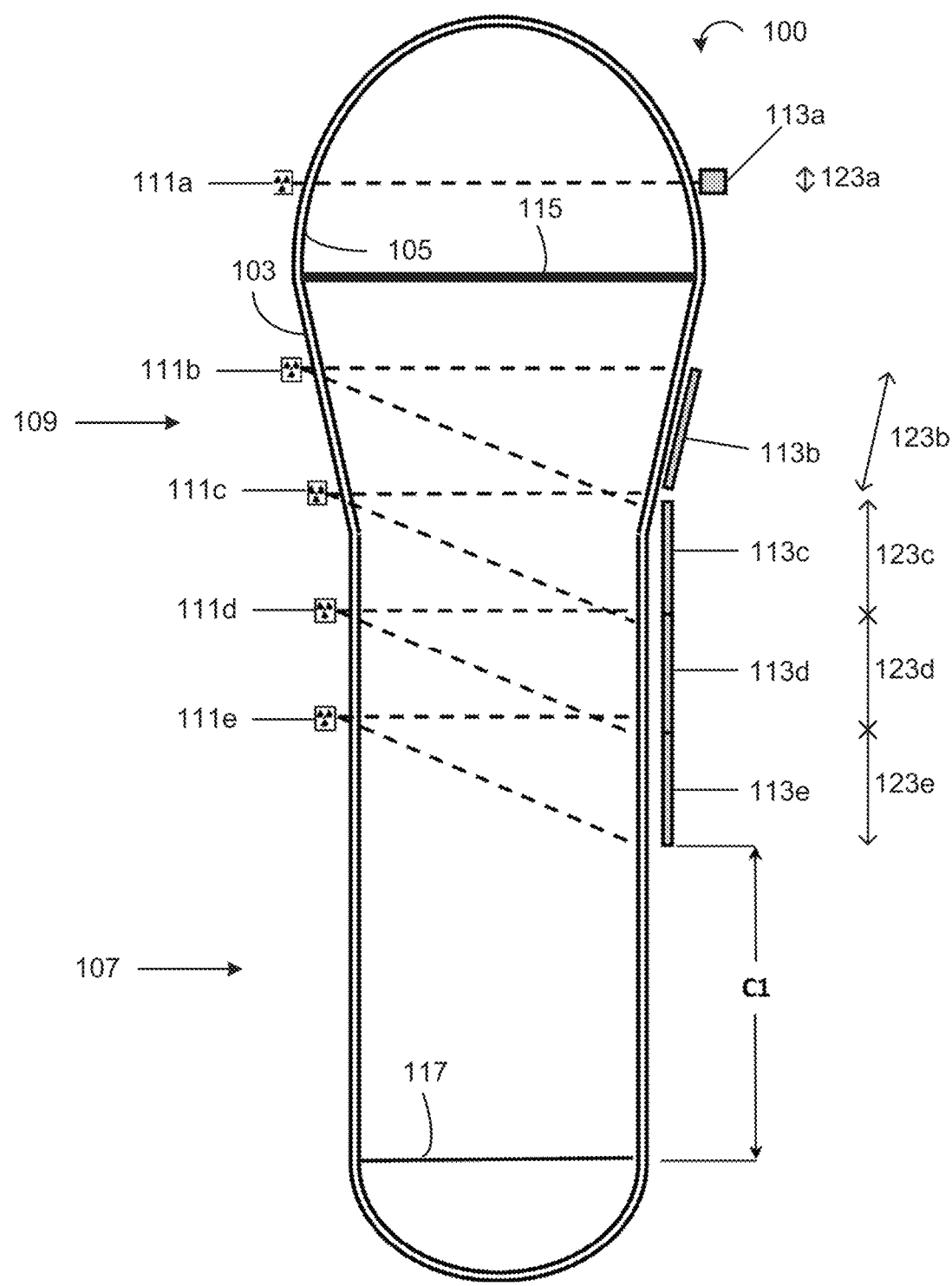
FIG. 2 is a schematic illustration of an empty fluidized bed reactor and system for detecting and/or controlling the level of a fluidized bed according to an embodiment of the present disclosure.

FIG. 2 illustrates a cross-sectional view of an exemplary fluidized bed reactor 100 and system for detecting and/or controlling the level of a fluidized bed according to an embodiment of the present disclosure. The fluidized bed reactor 100 has an outer surface 103, an inner surface 105, a reaction zone 107 and an expansion zone 109. In this figure, the fluidized bed reactor 100 is shown empty. The system includes five nuclear radiation sources 111a, 111b, 111c, 111d, 111e and five nuclear radiation detectors 113a, 113b, 113c, 113d, and 113e. Nuclear radiation source 111c and nuclear radiation detectors 113c, 113d, and 113e are located in the reaction zone 107. Each of the nuclear radiation detectors 113a, 113b, 113c, 113d, and 113e has a length 123a, 123b, 123c, 123d, and 123e, respectively.

Nuclear radiation sources 111a and 111b and nuclear radiation detectors 113a and 113b are located in the expansion zone 109. Line 115 depicts the maximum height of the fluidized bed. That is, the maximum height before unacceptable levels of solids would become entrained in the expansion zone. Line 117 depicts the minimum height of the fluidized bed. That is, the minimum height at which the fluidized bed can be operated and acceptable production rates can be obtained. In some embodiments, the minimum height 117 may be a distribution grid. As can be seen from this figure, the nuclear radiation detectors are located a height C1 above the minimum height 117 of the fluidized bed 100. As can be seen from this figure, the nuclear radiation sources 111a, 111b, 111c and nuclear radiation detectors 113a, 113b, 113c, 113d, and 113e are located opposite one another on the outer surface 103 of the fluidized bed reactor.

The height of the fluidized bed within the reactor can be calculated using the distance C1 from the minimum bed level 117 to the lowest nuclear radiation detector 113e, a dimensionless fluid bulk density factor C2, the detector lengths 123a, 123b, 123c, 123d, and 123e, and the radiation intensity measured at each nuclear radiation detector 113a, 113b, 113c, 113d, and 113e. Specifically, the height of the fluidized bed within the reactor can be calculated according to the following formula:

$$\text{Bed height} = \left(C1 + \sum_{i=1}^{n} (\text{Detector Length}_i * \text{Radiation Intensity}_i)\right) * C2,$$

where n is the number of radiation detectors, and in the illustrated figure n equals 5.

Figures 3A, 3B:
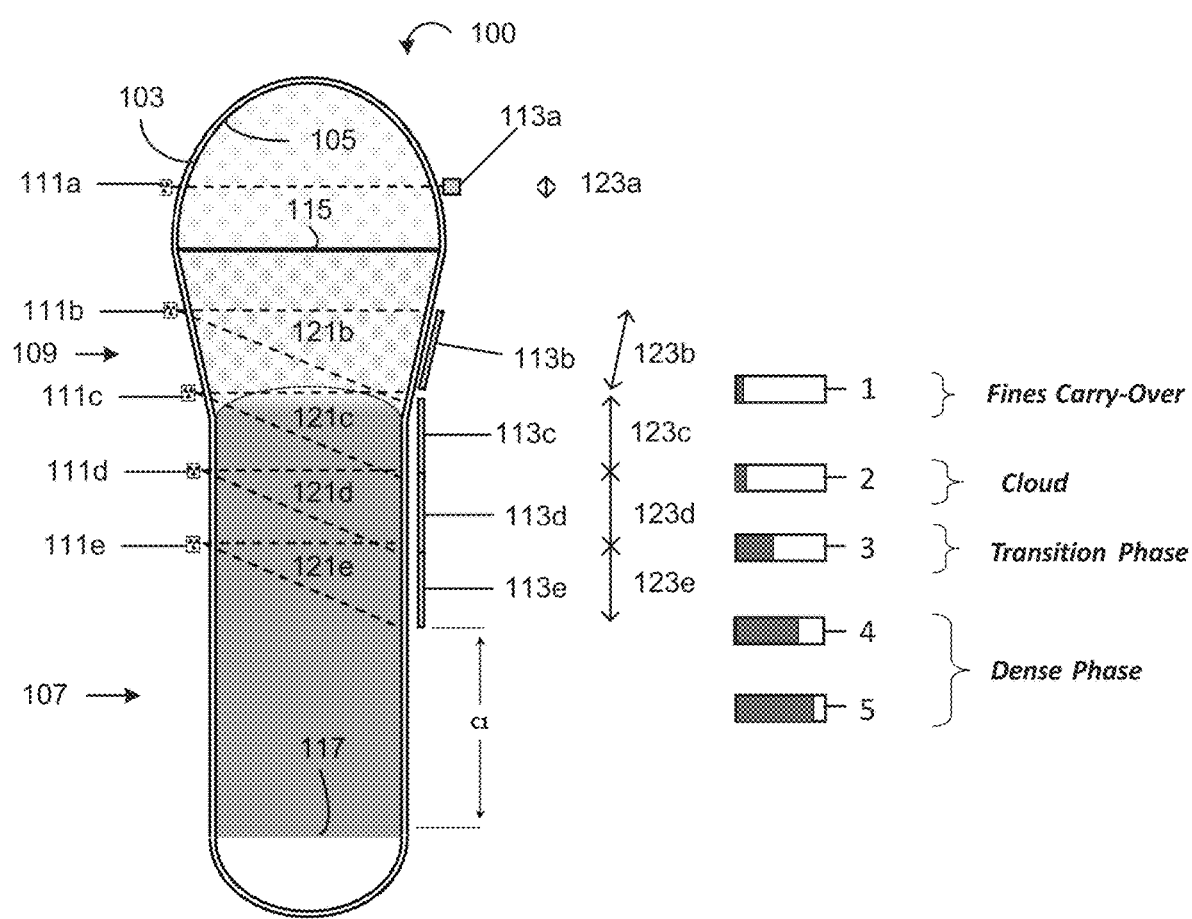
FIG. 3A is a schematic illustration of a fluidized bed reactor containing a fluidized bed of material and a system for detecting and/or controlling the level of a fluidized bed according to an embodiment of the present disclosure.
FIG. 3B is a schematic illustration of the amount of radiation detected by each of the radiation detectors and the relative calculated height of the fluidized bed shown in FIG. 3A.
Figures 4A, 4B:
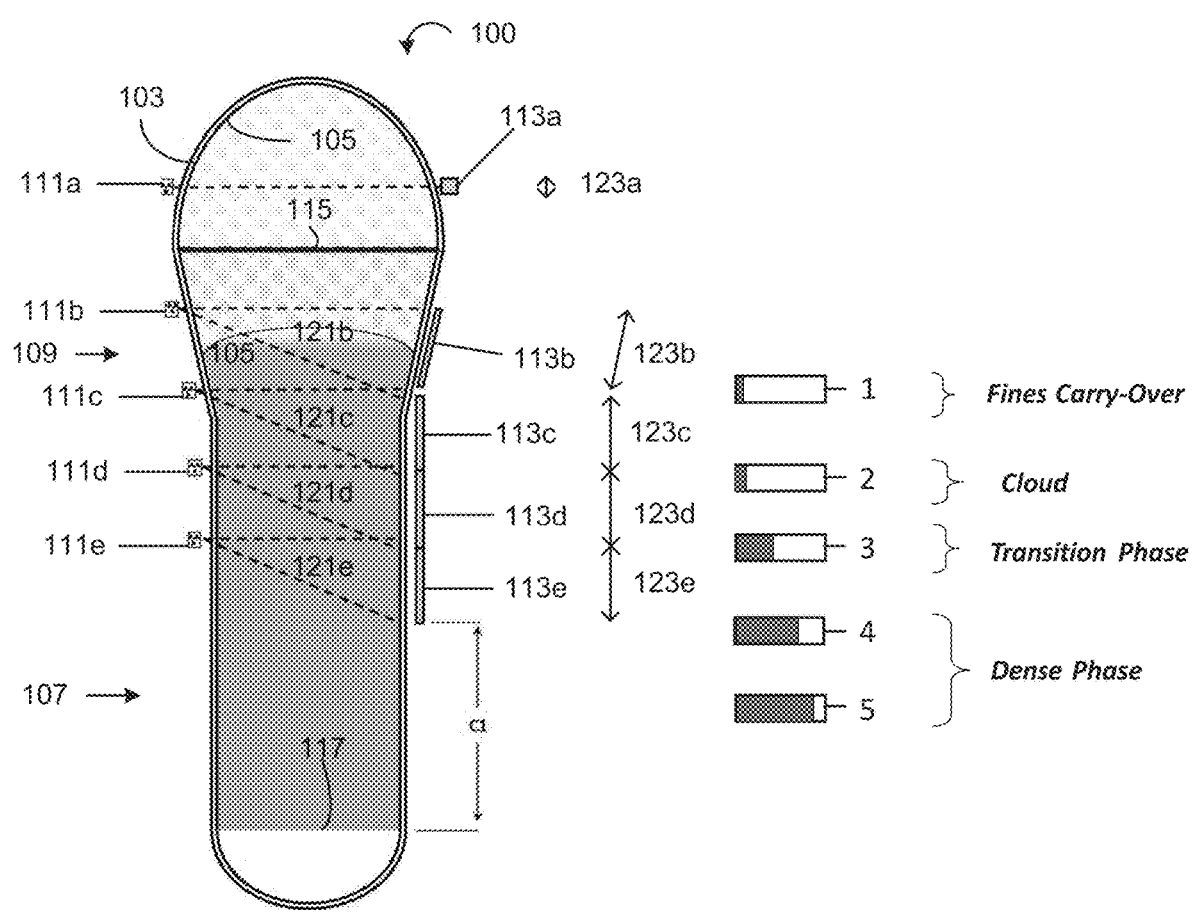
FIG. 4A is a schematic illustration of a fluidized bed reactor containing a fluidized bed of material at an optimized height and a system for detecting, controlling, and optimizing the level of a fluidized bed according to an embodiment of the present disclosure.
FIG. 4B is a schematic illustration of the amount of radiation detected by each of the radiation detectors and the relative calculated height of the fluidized bed shown in FIG. 4A.

FIGS. 3A and 4A are cross-sections of a fluidized bed reactor 100 as shown in FIG. 2, but with a fluidized bed of material 119 within the fluidized bed reactor 100. Nuclear radiation sources 111b, 111c, 111d, and 111e each generate nuclear radiation which radiates from the nuclear radiation sources in cone-shaped areas 121b, 121c, 121d, and 121e, respectively.

FIGS. 3B and 4B are schematic representations of the amount of radiation detected by each of radiation detectors 113a, 113b, 113c, 113d, and 113e and the relative calculated height of the fluidized bed. In FIGS. 3B and 4B, the white portion of each of boxes 1, 2, 3, 4, and 5 shows a schematic representation of the relative amount of radiation which reaches nuclear radiation detectors 113a, 113b, 113c, 113d, and 113e, respectively. That is, the white portion of each of boxes 1, 2, 3, 4, and 5 represents the relative percentage of amount of radiation which is detected by each of nuclear radiation detectors 113a, 113b, 113c, 113d, and 113e, respectively, when the fluidized bed 119 was at the level illustrated in FIGS. 3A and 3B, as compared to the level detected when the fluidized bed reactor 100 was empty, as shown in FIG. 2. As can be seen from FIGS. 3B and 4B, the amount of radiation detected by each of nuclear radiation detectors 113a, 113b, 113c, 113d, and 113e, respectively shows which phase of the fluidized bed reactor exists at each radiation detector. For example, as is illustrated in FIGS. 3B and 4B, boxes 4 and 5 illustrate a dense phase of the fluidized bed 119, box 3 illustrate to a transition phase, box 2 illustrates to a cloud phase, and box 1 illustrates to the fines carry-over phase.

Radiation detector 113a, which is located in the expansion zone 109, may be used to control and adjust reactor bed height by providing an indication of when the freeboard height is equal to the total disengaging height, as indicated by an increase in particle carry-over out of the reactor.

Examples

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims. Any use of the past tense to describe an example otherwise indicated as constructive or prophetic is not intended to reflect that the constructive or prophetic example has actually been carried out.

Prophetic Examples Based on Mathematical Models

Mathematical models were prepared of a fluidized bed reactor having a nuclear bed level detection system as described above. The modeled fluidized bed reactor included five nuclear radiation sources and six nuclear radiation detectors, H1, H2, H3, H4, H5, and P1, arranged from bottom to top along the reaction zone and expansion zone, respectively. The modeled fluidized bed reactor had a height from a distribution grid to the bottom of the lowest nuclear radiation detector H1 of 50 feet, and a dimensionless fluid bulk density factor of 1.033. The modeled fluidized bed reactor had a height of 97 feet. The reaction zone was a straight cylindrical portion of the reactor, and had a height of 65 feet. The expansion zone had a height of 32 feet.

Five bed height examples were calculated using an Excel® spreadsheet with the following equation:

$$\text{Bed height} = \left(C1 + \sum_{i=1}^{n} (\text{Detector Length}_i * \text{Radiation Intensity}_i)\right) * C2$$

These calculated examples are shown in Table 1 below:

TABLE 1

|  | C1 | C2 | L (ft.) | H1 Radiation Intensity | H2 Radiation Intensity | H3 Radiation Intensity | H4 Radiation Intensity | H5 Radiation Intensity | P1 Radiation Intensity | Bed Height (ft.) |
|---|---|---|---|---|---|---|---|---|---|---|
| Example 1 | 50 | 1.033 | 5 | 90% | 70% | 40% | 18% | 5% | 20% | 61.5 |
| Example 2 | 50 | 1.033 | 5 | 95% | 75% | 45% | 20% | 7% | 20% | 62.5 |
| Example 3 | 50 | 1.033 | 5 | 95% | 80% | 60% | 22% | 9% | 20% | 63.7 |
| Example 4 | 50 | 1.033 | 5 | 95% | 90% | 80% | 55% | 28% | 50% | 68.0 |
| Example 5 | 50 | 1.033 | 5 | 95% | 85% | 70% | 24% | 9% | 20% | 64.6 |

For each example disclosed in Table 1 above, C1 is the height of nuclear radiation detector H1 from the bottom of the reactor fluidizing distribution grid, C2 is a dimensionless fluid bed density factor, and L is the length of each nuclear radiation detector H1, H2, H3, H4, and H5.

As used in Table 1, radiation intensity refers to the percent of radiation which is absorbed by the fluidized bed before reaching the corresponding radiation detector. Without intending to be bound by any particular theory, it is believed that the radiation intensity for P1 is relatively higher than the radiation intensities of H1-H5 because of its location in the expansion section and the location of the nuclear radiation sources. That is, because P1 is located relatively high in the expansion zone, it is relatively farther from its corresponding nuclear radiation source than nuclear radiation detectors H1-H5 were from their corresponding nuclear radiation sources. Without intending to be bound by any particular theory, it is believed that, because P1 is located relatively further from its nuclear radiation source, it will have a higher radiation intensity than that measured by nuclear radiation detectors H1-H5 even if the fluidized bed reactor is empty.

In Example 1, a nuclear bed level detection system as described above was modeled to control bed height by maintaining a bed height of 61.5 feet, a standard height which may be maintained using prior art pressure differential transmitter systems. However, the poor reliability of pressure differential systems requires that bed heights be maintained at relatively low levels, to minimize fines carryover in the likely event that the bed height significantly exceeds the desired setpoint.

In Examples 2-5, higher bed heights which are thought to be achievable using the nuclear bed level detection system described above were also modeled. As can be seen in Table 1 above, examples 2, 3, and 5 were successful—the radiation intensity at P1 did not exceed 20%, indicating relatively low fines carryover. Specifically, Example 5 is an optimized reactor bed height, where the bed height was increased to the point where the freeboard height and transport disengaging height are equal, as indicated by a low reading on P1 and high readings on H1, H2, H3, H4, and H5.

In contrast, the simulation of Example 4 increased the height of the bed level too high. This resulted in insufficient freeboard height, as indicated by the level of fines carryover out of the reactor as indicated by P1.

Embodiments

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments typically are described as "comprising" but, alternatively, can "consist essentially of" or "consist of" unless specifically stated otherwise)

In accordance with a first aspect of the present disclosure, a system for detecting and/or controlling the level of solids in a fluidized bed reactor is described, the system comprising:

a fluidized bed reactor having a top end, a spaced-apart bottom end, a height, a circumference at each vertical distance from the bottom end, an outer surface, an inner surface, and an interior space;

a plurality of nuclear radiation sources disposed along the outer surface of the fluidized bed reactor between the top end and the bottom end, each at a different vertical distances from the bottom end; and a detector array comprising a plurality of radiation detectors disposed along the outer surface of the fluidized bed reactor between the top end and the bottom end, each at a different vertical distance from the bottom end, wherein a line between each radiation detector and each nuclear radiation source passes through the interior space of the fluidized bed reactor.

In accordance with a second aspect of the present disclosure, the system according to the first aspect of the present disclosure is described, wherein each of the plurality of nuclear radiation sources is located within a first vertical plane that contains the vertical axis of the fluidized bed reactor, and each of the plurality of nuclear radiation detectors is located within a second vertical plane that contains the vertical axis of the fluidized bed reactor.

In accordance with a third aspect of the present disclosure, the system according to the second aspect of the present disclosure is described, wherein the angle between the first vertical plane and the second vertical plane is about 0°, such that the plurality of nuclear radiation sources and the plurality of radiation detectors are disposed on opposite sides of the fluidized bed reactor.

In accordance with a fourth aspect of the present disclosure, the system according to any one of the first, second, or third aspects is described, wherein the detector array further comprises a computer configured to compare the measured intensity of the nuclear radiation at the plurality of radiation detectors, and determine the level of solids in the fluidized bed reactor.

In accordance with a fifth aspect of the present disclosure, the system according to the fourth aspect is described, wherein the computer is further configured to adjust the level of solids in the fluidized bed reactor by adjusting one or more of a solids removal rate, a fluidization velocity, a catalyst feed rate, a reactor gas density, a reactor gas composition, a reactor temperature, and/or a reactor pressure.

In accordance with a sixth aspect of the present disclosure, the system according to any one of the first, second, third, fourth, or fifth aspects is described, wherein the fluidized bed reactor comprises
 a reaction zone comprising a cylindrical portion extending from the bottom end toward the top end and having a reaction zone circumference; and
 an expansion zone above the reaction zone and having an expansion zone circumference at each vertical distance along the expansion zone that is greater than the reaction zone circumference.

In accordance with a seventh aspect of the present disclosure, the system according to any one of the first, second, third, fourth, fifth, or sixth aspects is described, wherein the fluidized bed reactor further comprises a distribution grid at the spaced-apart bottom end.

In accordance with an eighth aspect of the present disclosure, the system according to the sixth aspect is described, wherein the expansion zone comprises a conical transition portion between the reaction zone and the top end of the fluidized bed reactor, such that the diameter of the transition zone increases with increasing distance from the reaction zone.

In accordance with a ninth aspect of the present disclosure, the system according to any one of the first through eighth aspects is described, wherein the plurality of nuclear radiation sources includes at least one radiation source having a radioactivity of 5000 mCi located on the outer surface of the reaction zone, the expansion zone, or both.

In accordance with a tenth aspect of the present disclosure, the system according to any one of the first through ninth aspects is described, wherein the plurality of nuclear radiation sources includes at least 2 nuclear radiation sources.

In accordance with an eleventh aspect of the present disclosure, the system according to any one of the first through ninth aspects is described, wherein the plurality of nuclear radiation sources includes at least 3 nuclear radiation sources.

In accordance with a twelfth aspect of the present disclosure, the system according to any one of the first through eleventh aspects is described, wherein the plurality of radiation detectors includes at least 4 nuclear radiation detectors.

In accordance with a thirteenth aspect of the present disclosure, the system according to any one of the first through eleventh aspects is described, wherein the plurality of radiation detectors includes at least 6 nuclear radiation detectors.

In accordance with a fourteenth aspect of the present disclosure, the system according to any one of the first through ninth aspects is described, wherein the plurality of nuclear radiation sources includes 4 nuclear radiation sources and the plurality of radiation detectors includes 6 nuclear radiation detectors.

In accordance with a fifteenth aspect of the present disclosure, the system according to any one of the first through fourteenth aspects is described, wherein one or more of the plurality of radiation detectors is an ionization chamber, a proportional counter, a Geiger-Müller tube, or a scintillator.

In accordance with a sixteenth aspect of the present disclosure, the system according to any one of the first through fifteenth aspects is described, wherein one or more of the plurality of nuclear radiation sources is a Cesium gamma ($\gamma$) radiation source, a Cobalt gamma ($\gamma$) radiation source, or any combination thereof.

In accordance with a seventeenth aspect of the present disclosure, the system according to any one of the first through sixteenth aspects is described, wherein the plurality of nuclear radiation sources includes at least one radiation source having a radioactivity of 5000 mCi.

In accordance with an eighteenth aspect of the present disclosure, the system according to any one of the first through seventeenth aspects is described, wherein the plurality of nuclear radiation sources includes at least one 5000 mCi radiation source, at least one 2000 mCi radiation source, at least one 1000 mCi radiation source, and/or at least one 500 mCi radiation source.

In accordance with a nineteenth aspect of the present disclosure, the system according to any one of the first through the eighteenth aspects is described, wherein the fluidized bed reactor is a polyethylene reactor.

In accordance with a twentieth aspect of the present disclosure, a method for detecting and/or controlling the level of solids in a fluidized bed reactor is described, the method comprising:
 providing a fluidized bed reactor having a top end, a spaced-apart bottom end, a height, a circumference at each vertical distance from the bottom end, an outer surface, an inner surface, and an interior space;
 irradiating the interior space of the fluidized bed reactor using a plurality of nuclear radiation sources disposed along the outer surface of the fluidized bed reactor between the top end and the bottom end, each at a different vertical distances from the bottom end; and
 measuring the intensity of the nuclear radiation from the plurality of nuclear radiation sources using a detector array comprising a plurality of radiation detectors disposed along the outer surface of the fluidized bed reactor between the top end and the bottom end, each at a different vertical distance from the bottom end,
 wherein a line between each radiation detector and each nuclear radiation source passes through the interior space of the fluidized bed reactor; and
 calculating the level of solids in the fluidized bed reactor based on comparing the intensities of the nuclear radiation measured at the plurality of radiation detectors.

In accordance with a twenty-first aspect of the present disclosure, the method according to the twentieth aspect is described, wherein the method comprises calculating the level of fines carry-over out of the fluidized bed reactor by comparing the intensity of nuclear radiation measured at a nuclear radiation detector located above the widest part of the expansion zone to experimental data.

In accordance with a twenty-second aspect of the present disclosure, the method according to any one of the twentieth and twenty-first aspects is described, wherein the fluidized bed reactor comprises a reaction zone comprising a cylindrical portion extending from the bottom end toward the top end and having a reaction zone circumference; and an expansion zone above the reaction zone and having an expansion zone circumference at each vertical distance along the expansion zone that is greater than the reaction zone circumference.

In accordance with a twenty-third aspect of the present disclosure, the method according to any one of the twentieth to twenty-second aspects is described, wherein the fluidized bed reactor further comprises a distribution grid at the spaced-apart bottom end.

In accordance with a twenty-fourth aspect of the present disclosure, the method according to any one of the twentieth to twenty-third aspects is described, wherein calculating the level of solids in the fluidized bed reactor comprises using the intensities of the nuclear radiation measured at the plurality of radiation detectors in the following equation:

$$\text{Bed height} = \left( C1 + \sum_{i=1}^{n} (\text{Detector Length}_i * \text{Radiation Intensity}_i) \right) * C2$$

wherein C1 is the distance from the distribution grid to a bottom end of a lowest radiation detector, C2 is a normalized fluidized bulk density factor, and n is the number of radiation detectors.

In accordance with a twenty-fifth aspect of the present disclosure, the method according to any one of the twentieth to twenty-fourth aspects is described, wherein each of the plurality of nuclear radiation sources is located within a first vertical plane that contains the vertical axis of the fluidized bed reactor, and each of the plurality of nuclear radiation detectors is located within a second vertical plane that contains the vertical axis of the fluidized bed reactor.

In accordance with a twenty-sixth aspect of the present disclosure, the method according to the twenty-fifth aspect is described, wherein the angle between the first vertical plane and the second vertical plane is about 0°, such that the plurality of nuclear radiation sources and the plurality of radiation detectors are disposed on opposite sides of the fluidized bed reactor.

In accordance with a twenty-seventh aspect of the present disclosure, the method according to any one of the twentieth to twenty-sixth aspects is described, wherein the detector array further comprises a computer configured to perform the steps of comparing the measured intensities of the nuclear radiation at the plurality of radiation detectors, and determining the level of solids in the fluidized bed reactor.

In accordance with a twenty-eighth aspect of the present disclosure, the method according to the twenty-seventh aspect is described, wherein the computer further performs the step of adjusting the level of solids in the fluidized bed reactor by adjusting one or more of a solids removal rate, a fluidization velocity, a catalyst feed rate, a reactor gas density, a reactor gas composition, a reactor temperature, and/or a reactor pressure.

In accordance with a twenty-ninth aspect of the present disclosure, the method according to any one of the twentieth to twenty-eighth aspects is described, wherein the fluidized bed reactor comprises a reaction zone comprising a cylindrical portion extending from the bottom end toward the top end and having a reaction zone circumference; and an expansion zone above the reaction zone and having an expansion zone circumference at each vertical distance along the expansion zone that is greater than the reaction zone circumference.

In accordance with a thirtieth aspect of the present disclosure, the method according to the twenty-ninth aspect is described, wherein the expansion zone comprises a conical transition portion between the reaction zone and the top end of the fluidized bed reactor, such that the diameter of the transition zone increases with increasing distance from the reaction zone.

In accordance with a thirty-first aspect of the present disclosure, the method according to any one of the twentieth to thirtieth aspects is described, wherein the plurality of nuclear radiation sources includes at least one radiation source having a radioactivity of 5000 mCi located on the outer surface of the reaction zone, the expansion zone, or both.

In accordance with a thirty-second aspect of the present disclosure, the method according to any one of the twentieth to thirty-first aspects is described, wherein the plurality of nuclear radiation sources includes at least 2 nuclear radiation sources or at least 3 nuclear radiation sources.

In accordance with a thirty-third aspect of the present disclosure, the method according to any one of the twentieth to the thirty-second aspects is described, wherein the plurality of radiation detectors includes at least 3 nuclear radiation detectors or at least 4 nuclear radiation detectors.

In accordance with a thirty-fourth aspect of the present disclosure, the method according to any one of the twentieth to the thirty-first aspects is described, wherein the plurality of nuclear radiation sources includes 4 nuclear radiation sources and the plurality of radiation detectors includes 6 nuclear radiation detectors.

In accordance with a thirty-fifth aspect of the present disclosure, the method according to any one of the twentieth to thirty-fourth aspects is described, wherein one or more of the plurality of radiation detectors is an ionization chamber, a proportional counter, a Geiger-Müller tube, or a scintillator.

In accordance with a thirty-sixth aspect of the present disclosure, the method according to any one of the twentieth to thirty-fifth aspects is described, wherein one or more of the plurality of nuclear radiation sources is a Cesium gamma ($\gamma$) radiation source, a Cobalt gamma ($\gamma$) radiation source, or any combination thereof, and the plurality of nuclear radiation sources includes at least one radiation source having a radioactivity of 5000 mCi.

In accordance with a thirty-seventh aspect of the present disclosure, the method according to any one of the twentieth to the thirty-sixth aspects is described, wherein the plurality of nuclear radiation sources includes at least one 5000 mCi radiation source, at least one 2000 mCi radiation source, at least one 1000 mCi radiation source, and/or at least one 500 mCi radiation source.

In accordance with a thirty-eighth aspect of the present disclosure, the method according to any one of the twentieth to thirty-seventh aspects is described, wherein the fluidized bed reactor is a polyethylene reactor.

In accordance with a thirty-ninth aspect of the present disclosure, a method of reducing fines carryover from a fluidized bed reactor is described comprising:

adjusting the level of solids in the fluidized bed reactor based on the level of solids in the fluidized bed reactor calculated according to the method according to any one of embodiments 20-38.

In accordance with a fortieth aspect of the present disclosure, the method according to the thirty-ninth aspect is described, wherein the step of adjusting the level of solids in the fluidized bed reactor comprises adjusting one or more of a solids removal rate, a fluidization velocity, a catalyst feed rate, a reactor gas density, a reactor gas composition, a reactor temperature, and/or a reactor pressure.

What is claimed is:

1. A system for detecting and/or controlling the level of solids in a fluidized bed reactor, the system comprising:
    a fluidized bed reactor having a top end, a spaced-apart bottom end, a height, an outer surface, an inner surface, an interior space, and further comprising:
        a reaction zone comprising a cylindrical portion extending from the bottom end toward the top end and having a reaction zone circumference, and
        an expansion zone above the reaction zone and having an expansion zone circumference at each vertical distance along the expansion zone that is greater than the reaction zone circumference;
    a plurality of nuclear radiation sources disposed along the outer surface of the fluidized bed reactor between the top end and the bottom end, each at a different vertical distances from the bottom end; and
    a detector array comprising a plurality of radiation detectors disposed along the outer surface of the fluidized bed reactor between the top end and the bottom end, each at a different vertical distance from the bottom end,
    wherein a line between each radiation detector and each nuclear radiation source passes through the interior space of the fluidized bed reactor, and
    wherein the plurality of nuclear radiation sources includes at least one radiation source having a radioactivity of 5000 mCi located on the outer surface of the reaction zone, the expansion zone, or both.

2. The system of claim 1, wherein each of the plurality of nuclear radiation sources is located within a first vertical plane that contains the vertical axis of the fluidized bed reactor, and each of the plurality of nuclear radiation detectors is located within a second vertical plane that contains the vertical axis of the fluidized bed reactor.

3. The system of claim 2, wherein the angle between the first vertical plane and the second vertical plane is about 0°, such that the plurality of nuclear radiation sources and the plurality of radiation detectors are disposed on opposite sides of the fluidized bed reactor.

4. The system of claim 1, wherein the detector array further comprises a computer configured to compare the measured intensity of the nuclear radiation at the plurality of radiation detectors, and determine the level of solids in the fluidized bed reactor.

5. The system of claim 4, wherein the computer is further configured to adjust the level of solids in the fluidized bed reactor by adjusting one or more of a solids removal rate, a fluidization velocity, a catalyst feed rate, a reactor gas density, a reactor gas composition, a reactor temperature, and/or a reactor pressure.

6. The system of claim 1, wherein the fluidized bed reactor further comprises a distribution grid at the spaced-apart bottom end.

7. The system of claim 1, wherein the expansion zone comprises a conical transition portion between the reaction zone and the top end of the fluidized bed reactor, such that the diameter of the transition zone increases with increasing distance from the reaction zone.

8. The system of claim 1, wherein the plurality of nuclear radiation sources includes at least 3 nuclear radiation sources.

9. The system of claim 1, wherein the plurality of radiation detectors includes at least 4 nuclear radiation detectors.

10. The system of claim 1, wherein the plurality of nuclear radiation sources includes 4 nuclear radiation sources and the plurality of radiation detectors includes 6 nuclear radiation detectors.

11. The system of claim 1, wherein one or more of the plurality of radiation detectors is an ionization chamber, a proportional counter, a Geiger-Müller tube, or a scintillator.

12. The system of claim 1, wherein one or more of the plurality of nuclear radiation sources is a Cesium gamma ($\gamma$) radiation source, a Cobalt gamma ($\gamma$) radiation source, or any combination thereof.

13. The system of claim 1, wherein the plurality of nuclear radiation sources includes at least one 5000 mCi radiation source, at least one 2000 mCi radiation source, at least one 1000 mCi radiation source, and at least one 500 mCi radiation source.

14. The system of claim 1, wherein the fluidized bed reactor is a polyethylene reactor.

15. A system for detecting and/or controlling the level of solids in a fluidized bed reactor, the system comprising:
    a fluidized bed reactor having a top end, a spaced-apart bottom end, a height, an outer surface, an inner surface, and an interior space;
    a plurality of nuclear radiation sources disposed along the outer surface of the fluidized bed reactor between the top end and the bottom end, each at a different vertical distances from the bottom end; and
    a detector array comprising a plurality of radiation detectors disposed along the outer surface of the fluidized bed reactor between the top end and the bottom end, each at a different vertical distance from the bottom end,
    wherein a line between each radiation detector and each nuclear radiation source passes through the interior space of the fluidized bed reactor, and
    wherein the plurality of nuclear radiation sources includes at least one radiation source having a radioactivity of 5000 mCi.

16. The system of claim 15, wherein the wherein the plurality of nuclear radiation sources further includes at least one 2000 mCi radiation source, at least one 1000 mCi radiation source, and at least one 500 mCi radiation source.

17. The system of claim 15, wherein each of the plurality of nuclear radiation sources is located within a first vertical plane that contains the vertical axis of the fluidized bed reactor, and each of the plurality of nuclear radiation detectors is located within a second vertical plane that contains the vertical axis of the fluidized bed reactor.

18. The system of claim 17, wherein the angle between the first vertical plane and the second vertical plane is about 0°, such that the plurality of nuclear radiation sources and the plurality of radiation detectors are disposed on opposite sides of the fluidized bed reactor.

19. The system of claim 15, wherein the fluidized bed reactor is a polyethylene reactor.

* * * * *